Dec. 12, 1950 F. R. LAMBERTY ET AL 2,533,476

AUTOMATIC TELEPHONE SYSTEMS INVOLVING PREPAYMENT TELEPHONE LINES

Filed June 30, 1948 2 Sheets-Sheet 1

INVENTORS: F. R. LAMBERTY
A. S. MARTINS
W. T. WICHMAN

BY A. F. Kane

ATTORNEY

INVENTORS: F. R. LAMBERTY
A. S. MARTINS
W. T. WICHMAN
BY A. F. Kane
ATTORNEY

Patented Dec. 12, 1950 2,533,476

UNITED STATES PATENT OFFICE 2,533,476

AUTOMATIC TELEPHONE SYSTEMS INVOLVING PREPAYMENT TELEPHONE LINES

Frederick R. Lamberty, Rockville Centre, Arthur S. Martins, New Hyde Park, and Wesley T. Wichman, New York, N. Y., assignors to Bell Telephone Laboratories, Incorporated, New York, N. Y., a corporation of New York Application June 30, 1948, Serial No. 36,024

11 Claims. (Cl. 179—6.3)

Figure 1:
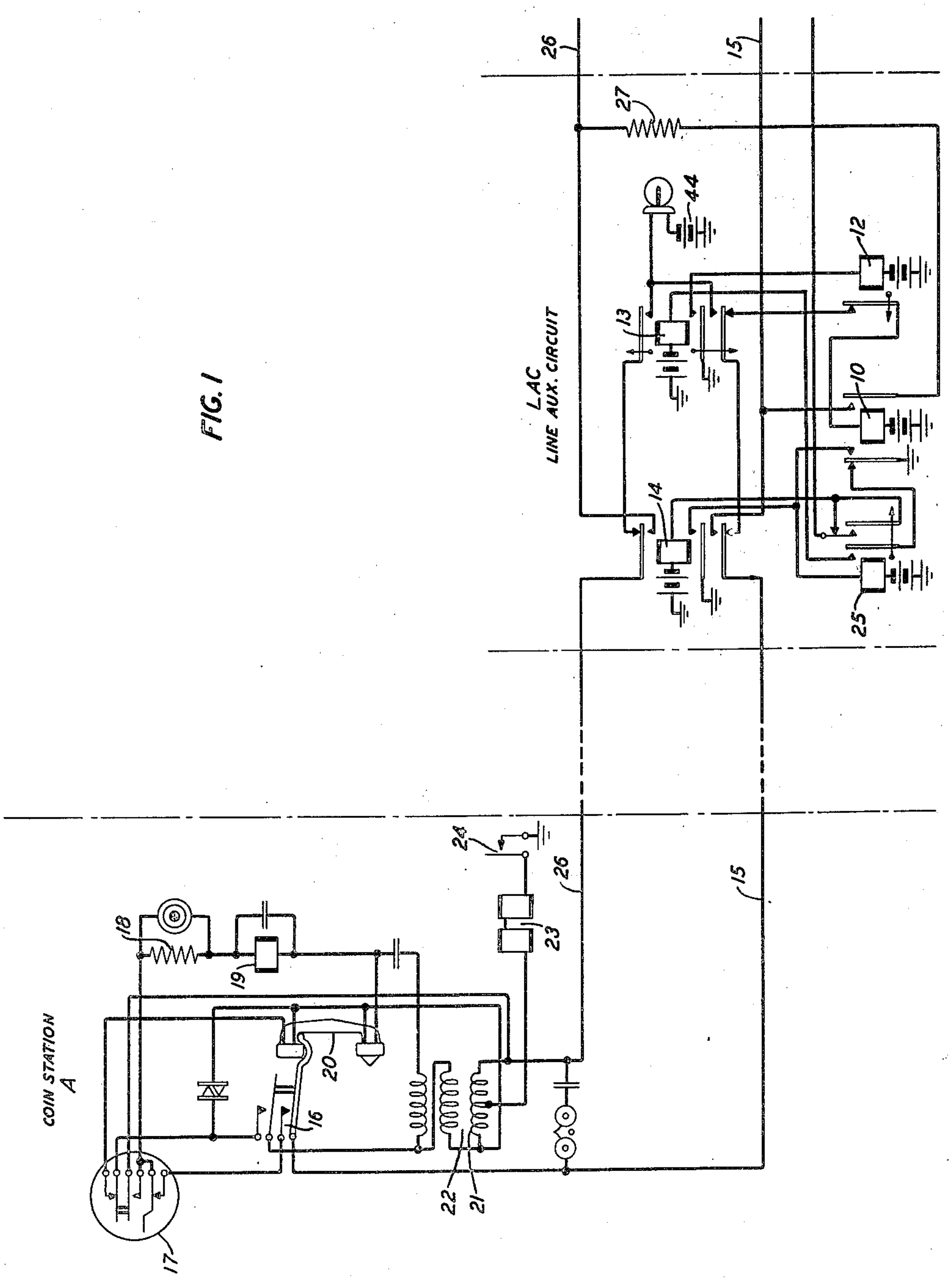

This invention relates to telephone systems and particularly to systems involving coin stations of the prepayment type.

Objects of the invention are to guard against fradulent operation of coin stations and to otherwise improve telephone systems in which the deposit of one or more coins in a coin box is required to originate a telephone call.

The origination of a telephone call at a coin box station requires, in general, the deposit of a single coin, usually a nickel, in the coin collector located at the station for that purpose.

In a copending application, Serial No. 13,850 filed March 9, 1948, there is disclosed a coin collector which requires for its operation, in the origination of a telephone call, the deposit of two nickels, or of a coin of greater value than one nickel. In this device the first nickel deposited is trapped in the coin box chute until the second nickel is deposited and trips a mechanism which permits both nickels to pass and effect a call-originating signal. When both nickels have passed within the hopper the resulting ground signal causes an electromagnet at the station to operate on battery from the central office and to condition the coin chute so as to permit it to pass any subsequently singly deposited nickel which may be required for overtime toll. On a call terminating at this coin collector, battery and ground supplied from the central office will likewise operate the electromagnet at the station to condition the coin chute so as to permit it to pass any singly deposited nickel, even though deposit of coins by the called subscriber at the coin box station is not required on such terminating calls. It has been determined that such a mechanism is susceptible to fraudulent use in that an unscrupulous subscriber might, during the pendency of a call terminated at the coin box station and in contemplation of the origination of a subsequent call, deposit a nickel in the coin collector when the chute is conditioned to accept such deposit and thus, at the termination of the first connection gain access to the central office equipment for use in originating the subsequent call for less than the prescribed tariff.

A feature of this invention precludes the possibility of such fraudulent use of coin box equipment by providing for the automatic refund of any and all undisposed of coins which may remain in the coin hopper at a coin box station at the termination of a connection involving that station. More particularly, means are provided in a line auxiliary circuit which functions on disconnect, both on terminating and originating calls, to automatically apply coin return potential to the coin box line and to thus clear the coin box of all, if any, coins which may be in the coin hopper at that time.

Heretofore, no provision was made to effect the automatic return of coins to a calling subscriber in the event an originating call was abandoned before the central office switching equipment functioned to connect the calling line to associated circuits in the central office. In accordance with another feature of this invention the line auxiliary circuit functions automatically to apply coin return potential to the calling line should a call originated at the station associated with the line auxiliary circuit be abandoned during the time interval first referred to.

Figure 2:
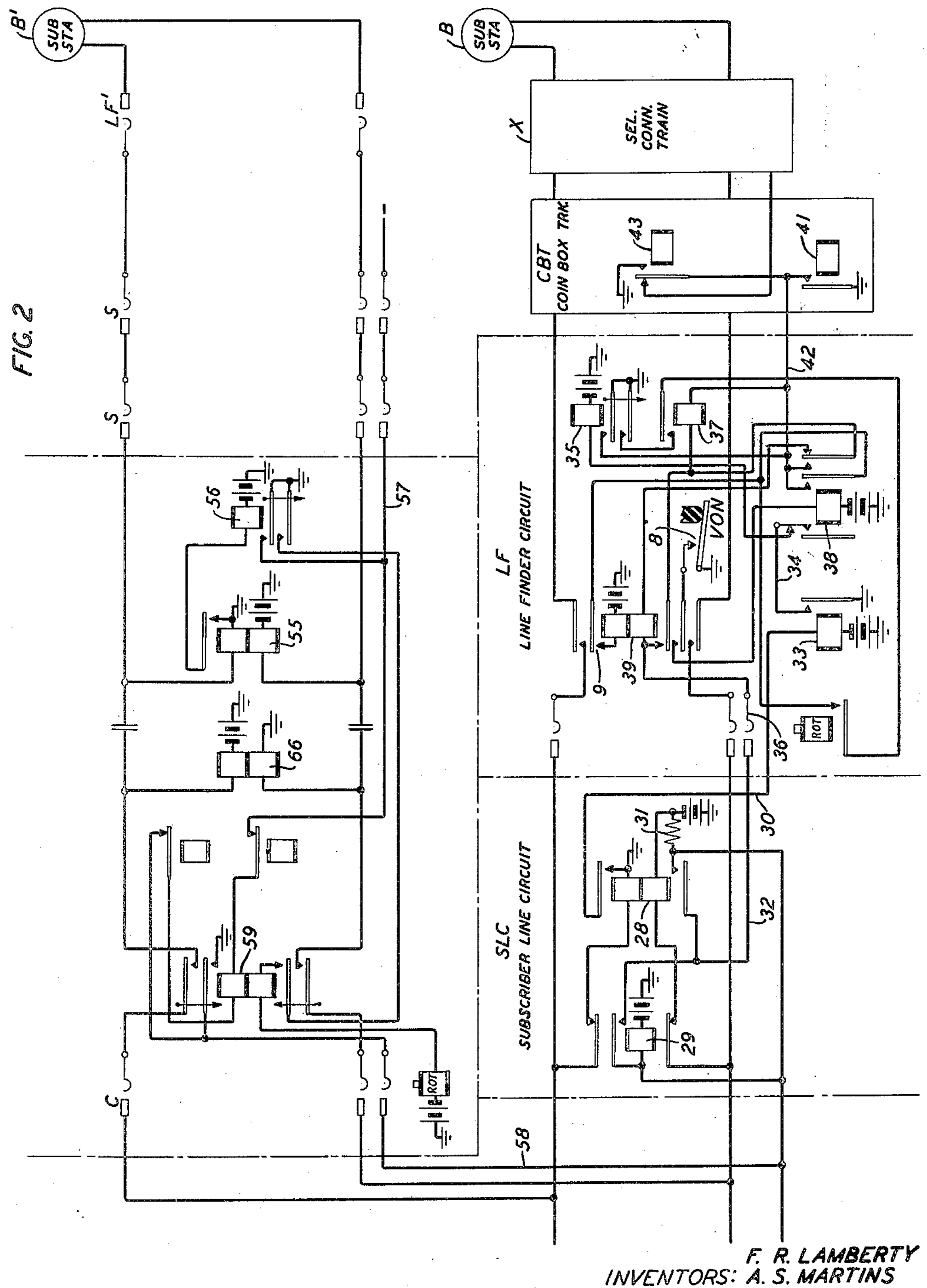

These and other features of the invention will be better understood from the following detailed description when read with reference to the accompanying drawings. Figs. 1 and 2 of which when placed side by side disclose a circuit diagram involving those elements of an automatic telephone system which function with the line auxiliary circuit of this invention in attaining the features set forth above. The circuit shows a coin station connected through a line auxiliary circuit and a line circuit to line finder and connector bank terminals in well-known manner, and other well-known circuits and automatic switches, which are employed in extending connections, both terminating and originating, between calling and called subscriber stations. It is indicated, in this connection, that only those elements of the line finder and coin box trunk circuit, on an originating call, and of the connector, on a terminating call, that are essential to an understanding of the invention are shown in detail.

*Originating call*

The subscriber's station A is diagrammatically illustrative of a coin box station at which a coin collector of the type disclosed in the above identified copending application is located. This station circuit distinguishes from well-known station circuits primarily in the addition of the electromagnet 19 which, incident to the deposit of two nickels or a coin of greater value than one nickel in the station coin box, is energized from battery at the central office to condition the coin box chute so as to render it capable of accepting a subsequent deposit of a single nickel.

When the subscriber at station A wishes to originate a call the proper coins are deposited in the coin box to close coin contacts 24 and the telephone handset 20 is removed from its support. When these events take place relay 10 in the line auxiliary circuit LAC operates in a circuit which may be traced from grounded battery, winding of relay 10, back contact and armature of slow releasing relay 12, back contact and outer lower armature of relay 13, back contact and outer lower armature of cut-off relay 14, ring conductor 15, switchhook contact 16, normal dialing contacts of dial 17, gong transmitter coil 18, winding of electromagnet 19, transmitter of telephone handset 20, winding 21 of inductance coil 22, windings of coil magnet 23, coin contact 24 to ground. Electromagnet 19 also operates in this circuit to perform the function ascribed to it hereinabove.

Relay 10, operated, establishes by way of its left armature and front contact an operating circuit for slow releasing relay 25. At its right armature relay 10 bridges resistance 27 across the tip and ring conductors 26 and 15, respectively, of the subscriber's line circuit SLC for a purpose to be described presently.

Relay 25, operated, prepares an operating circuit for relay 13.

With resistance 27 bridged across the line, relay 28 operates in a circuit which includes, grounded battery, lower winding of relay 28, back contact and lower armature of cut-off relay 29, ring conductor 15, front contact and right armature of relay 10, resistance 27, tip conductor 26, outer upper armature and back contact of relay 29, upper winding of relay 28, and ground.

Relay 28, at its upper armature and front contact connects ground potential to conductor 30 which causes the subgroup relay 33 of the line finder LF to operate and to cause the line finder LF to initiate its line hunting function in a manner well known in the art. At its lower armature and front contact, relay 28 connects battery through its tertiary winding 31 in parallel with the windings of relays 29 and 14 to the sleeve conductor 32 in the bank of terminals corresponding to the calling line.

Relay 33 applies ground to the start conductor 34 which causes slow to release relay 35 to operate in an obvious circuit. At its inner armature and front contact relay 35 connects ground potential to the sleeve wiper 36 of the line finder over a circuit which includes the winding of relay 37, outer right armature and back contact of relay 38 and the lower winding of relay 39. The line finder steps vertically and in a rotary manner, as is well known, until the now grounded sleeve wiper 36 reaches the sleeve terminal of the calling line which now has battery connected thereto by way of the lower armature and front contact of relay 28 in the line circuit, and conductor 32.

When the line finder wiper 36 finds the marked terminal of the calling line, relay 39 in the finder circuit operates in series with the winding of stepping relay 37 sufficiently to close its contacts 9. Relay 37 holds operated to prevent further stepping of the finder. Cut-off relay 29 also operates at this time in series with the windings of relays 39 and 37, and by way of its front contact and inner upper armature locks to the sleeve conductor 32. Relay 29, operated, disconnects the windings of relay 28 from the tip and ring conductors 26 and 15 causing this relay to release, which in turn causes subgroup relay 33 to release. Upon closure of contacts 9 of relay 39 this relay becomes fully operated thereby closing the tip and ring conductors through to the calling line and causing relay 38 to operate to ground at the vertical off-normal contact 8.

Relay 38, at its front contact and outer right armature connects direct ground to the sleeve wiper 36 by way of the innermost lower armature and front contact of relay 39 and, at its inner right armature and front contact maintains a locking circuit for relay 39. The direct ground on sleeve wiper 36 extends back over the associated finder terminal, conductor 32, front contact and inner upper armature of relay 29, outer armature and front contact of relay 25, to grounded battery through the winding of cut-off relay 14.

Relay 14 operates in the circuit traced above and releases relay 10; holds relay 25 operated by way of its inner lower armature and front contact; and, at its remaining two armatures and front contacts cuts the tip and ring conductors of the calling line through. The release of relay 10 removes the bridge resistance 27 from across the tip and ring conductors and causes relays 13 and 12 to operate in tandem. These relays perform no useful function at this time.

Thus far the subscriber at the calling station A has initiated a call and the line finder LF has functioned to seize the calling line and, with the operation of relay 39, has extended the connection through to a coin box trunk CBT in accordance with well-known practice. When the coin station is connected through to the trunk CBT by the line finder a relay (not shown) in the trunk operates over the line loop and causes relay 41 to operate in well-known manner. Relay 41 operated, connects ground to the sleeve conductor 42 which holds relay 39 operated after relay 35 releases, and holds the line finder. It will be observed that the line finder which is now held by the application of ground to the sleeve by relay 41 in the coin box trunk extends the now grounded sleeve through to the line and auxiliary line circuits.

It is deemed unnecessary to describe in detail how the call, originated at the calling station is extended further. Suffice it to say that dial tone is applied to the trunk in the usual manner and the calling subscriber upon hearing it proceeds to dial the station designation of the desired called line. The selector-connector train indicated at X functions in well-known manner under control of the dial 17 to extend the connection to the called line. Further, relay 43 in accordance with well-known practice operates during this switch operation to maintain ground potential on the sleeve conductor 42 after relay 41 releases when the called subscriber at station B answers.

*Disconnection*

When the calling subscriber disconnects, the line finder is still held by ground at the armature and front contact of relay 43. Upon disconnection a relay (not shown) in the coin box trunk releases causing the trunk to perform its usual coin disposal function whereupon relay 43 releases removing ground from the sleeve lead 42 of the connection. This causes cut-off relays 29 and 14 to deenergize and to restore their armatures.

Relay 14 released, opens the tip and ring conductors 26 and 15 of the line circuit and releases relay 25 which, in turn, releases relay 13. However, before the latter releases, the source 44 of coin return potential is connected to the tip and ring of the calling line by way of the front contacts and the upper and outer lower armatures of relay 13 and the back contacts and upper and outer lower armatures of relay 14. When relay 13 releases coin potential is removed from the line and relay 12 releases, in turn connecting the winding of relay 10 to the ring conductor 15 in preparation for the next call from the coin box station.

The momentary application of coin return potential to the line in the manner described clears the coin box at the calling station of all coins, if any, which may be in the coin hopper at that time. It is understood, of course, that any coins which may have been deposited by the calling subscriber in payment of the connection just described would be disposed of in the usual and well-known manner by the coin box trunk CBT. While the momentary application of coin return potential by the line auxiliary circuit to the calling line at the termination of an originating call may appear superfluous, the application of such potential at the end of a terminating connection and on abandonment is of importance as will appear from the following description.

*Abandoned call*

If at any time a call, originated at the coin box station A, is abandoned before ground potential is returned on the sleeve lead 32 to effect the operation of cut-off relay 14, the line loop would be open at the switchhook contacts at station A and relay 10 would be deenergized. At its right armature relay 10 removes the subscriber line circuit seizure bridge 27 from the connection to effect the release of relay 28 and the restoral of the line finder in the usual manner.

At its left armature and front contact relay 10 opens the energizing circuit for relay 25 which relay, being slow to release maintains its armatures operated for a short interval. At its left back contact relay 10 completes an energizing circuit for relay 13 which obtains until relay 25 releases. During this interval relay 13 operates and connects the source 44 of coin return potential to the tip and ring conductors of the station loop so that the coin magnet 23 at station A is energized and operates in a well-known manner to refund whatever coins were deposited in the coin box to originate the call.

*Terminating call*

When a call is directed to the coin box station A from another station such as station B′, the connection is extended in well-known manner over the calling subscriber's line circuit, a line finder LF′, a selector switch train S—S and a connector C in the terminal bank of which the called line on which station S is located appears. When the connector C is seized by the preceding selector, relay 55 operates in well-known manner over the closed loop. Relay 55, operated, completes an obvious operating circuit for slow releasing relay 56. At its inner armature and front contact relay 56 returns ground potential to the sleeve lead 57 for holding the preceding switches in the operated position and to guard the connector C from seizure by other hunting selector circuits. At its outer armature relay 56 prepares a circuit for operating the stepping magnets of the connector in well-known manner and prepares other holding circuits, all of which functions are well known in the connector switch operation.

When the connector encounters the terminals of the called line, battery on the sleeve lead 58, indicative of the idle condition of the line, causes relay 59 in the connector C to operate. In operating, relay 59 locks under control of relay 56, cuts through the tip and ring conductors of the connection, and connects direct ground to the sleeve lead 58. Relay 29 also operates incident to the seizure of the called line and performs the usual functions performed by the subscriber's line circuit cut-off relay. Upon the connection of direct ground to the sleeve lead 58 cut-off relay 14 in the line auxiliary circuit operates in an obvious circuit. The called line is rung and the call proceeds in the usual well-known manner.

When cut-off relay 14 operates, the tip and ring conductors 15 and 26 are cut through to the called station, the winding of relay 10 is removed from the ring lead 15 and relay 25 is operated in an obvious circuit. With relay 10 released and relay 25 operated, relay 13 operates in an obvious circuit, in turn operating relay 12.

When the conversation on the established connection is concluded, both parties restore their telephones to their respective supports. When the calling subscriber at station B′ disconnects, relay 55 is deenergized and causes relay 56 to restore its armatures. The holding circuit for relay 59 is now interrupted and relay 59 is released. At its inner upper armature relay 59 removes ground potential from the sleeve lead 58 causing relays 29 and 14 to restore. At its upper armature and outer lower armature and back contacts relay 14 completes the connection of the coin return potential source 44 to the tip and ring conductors of the called line of station A. These circuits include the upper and outer lower armatures and front contacts of slow to release relay 13. Thus, had the called subscriber at station A, contemplating the origination of a call upon the termination of the connection with station B′, deposited a coin in the coin box at station A the same would be returned when the coin magnet 23 responded to the application of coin return potential 44 to the line.

A short interval after the release of cut-off relay 14, slow releasing relay 25 releases its armatures. Relay 13 is thus deenergized and opens the circuit to relay 12. The circuit is thus restored to normal, the release of relay 13 disconnecting the coin return potential source 44 from the back contacts of relay 14.

On the terminating call just described battery and ground supplied from the central office through the windings of relay 66 in the connector C operate the electromagnet 19 at station A to condition the coin chute thereat in the manner previously described.

While the invention is disclosed and described with particular reference to an automatic telephone system of the step-by-step type it is to be understood that it is equally applicable to other known types of switching systems, such as panel and crossbar. It is to be understood also that while the invention has been described in connection with a coin station having a particular type of coin collector mechanism thereat, it is equally applicable to systems involving other types of coin collector apparatus.

What is claimed is:

1. In a telephone system, a calling line, a called line, a coin box station on said called line, means for completing a telephone communication connection between said lines, a source of coin return potential, and means effective incident to a disconnect on a connection between said lines for connecting said source of coin return potential to said called line.

2. In a telephone system, a calling line, a called line, a coin box station on said called line, means for completing a telephone communication connection between said lines, a source of coin return potential and means effective incident to a disconnect on a connection between said lines for momentarily connecting said source of coin return potential to said called line.

3. In a telephone system, a calling line, a called line, a coin box station on said called line, means including automatic switches controlled from said calling line for extending a connection therefrom to said called line, a source of coin return potential, and means controlled from one of said switches incident to the termination of the connection between said lines for connecting said source of coin return potential to said called line.

4. In a telephone system, a communication connection involving calling and called lines, a coin box station on the called line and having a coin control magnet thereat, and means effective automatically, incident to a disconnect on said connection, for operating said coin control magnet.

5. In a telephone system, a calling line, a called line, a coin box station on said called line, means for completing a communication connection between said lines, a source of coin control potential, and means effective incident to a disconnect on a connection between said lines for connecting said source of coin control potential to said called line.

6. In a telephone system, a coin box station, a line circuit therefor, a source of coin control potential associated with said line circuit, a line relay in said line circuit, a cut-off relay in said line circuit, means controlled by said line relay incident to the origination of a call at said coin box station for preparing the connection of said source of coin control potential to said line by way of back contacts of said cut-off relay, and means controlled by said line relay incident to the abandonment of the originated call for completing the connection of said source of coin control potential to said line.

7. In a telephone system, the combination defined in the preceding claim in which the means controlled by said line relay includes slow-to-release relays.

8. In a telephone system, a coin box station, a line circuit therefor comprising tip, ring and sleeve conductors, a source of coin return potential, means responsive to the application of ground potential to the sleeve conductor of said line circuit incident to the seizure thereof on a call directed to said station and to the subsequent removal of ground potential from the sleeve conductor for connecting said source of coin return potential to said station.

9. In a telephone system, a coin box station, a line circuit therefor comprising tip, ring and sleeve conductors, a source of coin return potential, a pair of slow-to-release relays, a cut-off relay operating in response to the application of ground potential to the sleeve conductors of said line circuit incident to the seizure thereof on a call incoming to said station, means controlled by said cut-off relay when operated for operating said slow-to-release relays, and means including operated contacts of one of said slow-to-release relays and normal contacts of said cut-off relay for connecting said source of coin return potential to said station.

10. In a telephone system, a calling line, a coin box station on said calling line, a called line, means including a line finder for completing a connection between said calling and called lines, means responsive to the origination of a call at said coin box station for causing said line finder to operate and seize said calling line, a source of coin return potential, and means effective incident to the abandonment of the connection at said coin box station prior to the seizure of said calling line by said line finder for connecting said source of coin return potential to said calling line.

11. In a telephone system, a calling line, a coin box station on said calling line, means including a line auxiliary circuit and a line finder for completing a connection between said calling and called lines, means responsive to the origination of a call at said coin box station for causing said line finder to operate and seize said calling line, a source of coin return potential associated with said line auxiliary circuit, and switching means effective incident to the abandonment of the originated call at said coin box station prior to the seizure of said calling line by said line finder for connecting said source of coin return potential to said calling line.

FREDERICK R. LAMBERTY.
ARTHUR S. MARTINS.
WESLEY T. WICHMAN.

REFERENCES CITED

The following references are of record in the file of this patent:

UNITED STATES PATENTS

| Number | Name | Date |
|---|---|---|
| 1,929,474 | Brooks | Oct. 10, 1933 |
| 2,444,074 | Van Damme | June 29, 1948 |
| 2,460,936 | Jackman | Feb. 8, 1949 |